March 9, 1937.  E. T. TURNEY  2,073,505
MILLING MACHINE
Filed Feb. 4, 1936  4 Sheets-Sheet 1

INVENTOR
EUGENE T. TURNEY
BY Philip S. McLean
ATTORNEY

March 9, 1937.  E. T. TURNEY  2,073,505
MILLING MACHINE
Filed Feb. 4, 1936  4 Sheets-Sheet 2

INVENTOR
EUGENE T. TURNEY
BY Philip S. McLean
ATTORNEY

March 9, 1937.  E. T. TURNEY  2,073,505
MILLING MACHINE
Filed Feb. 4, 1936  4 Sheets-Sheet 3
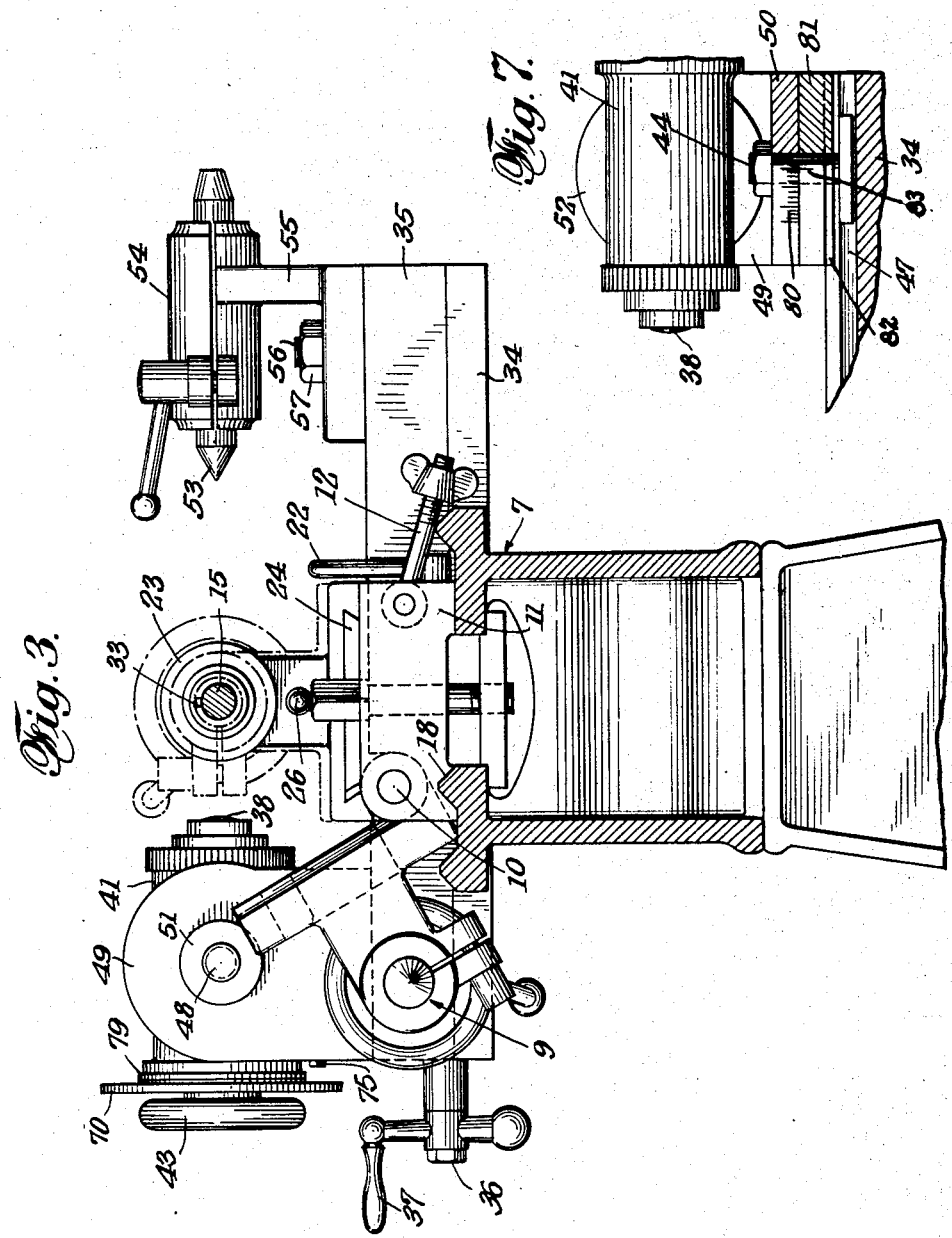
INVENTOR
EUGENE T. TURNEY
BY
ATTORNEY

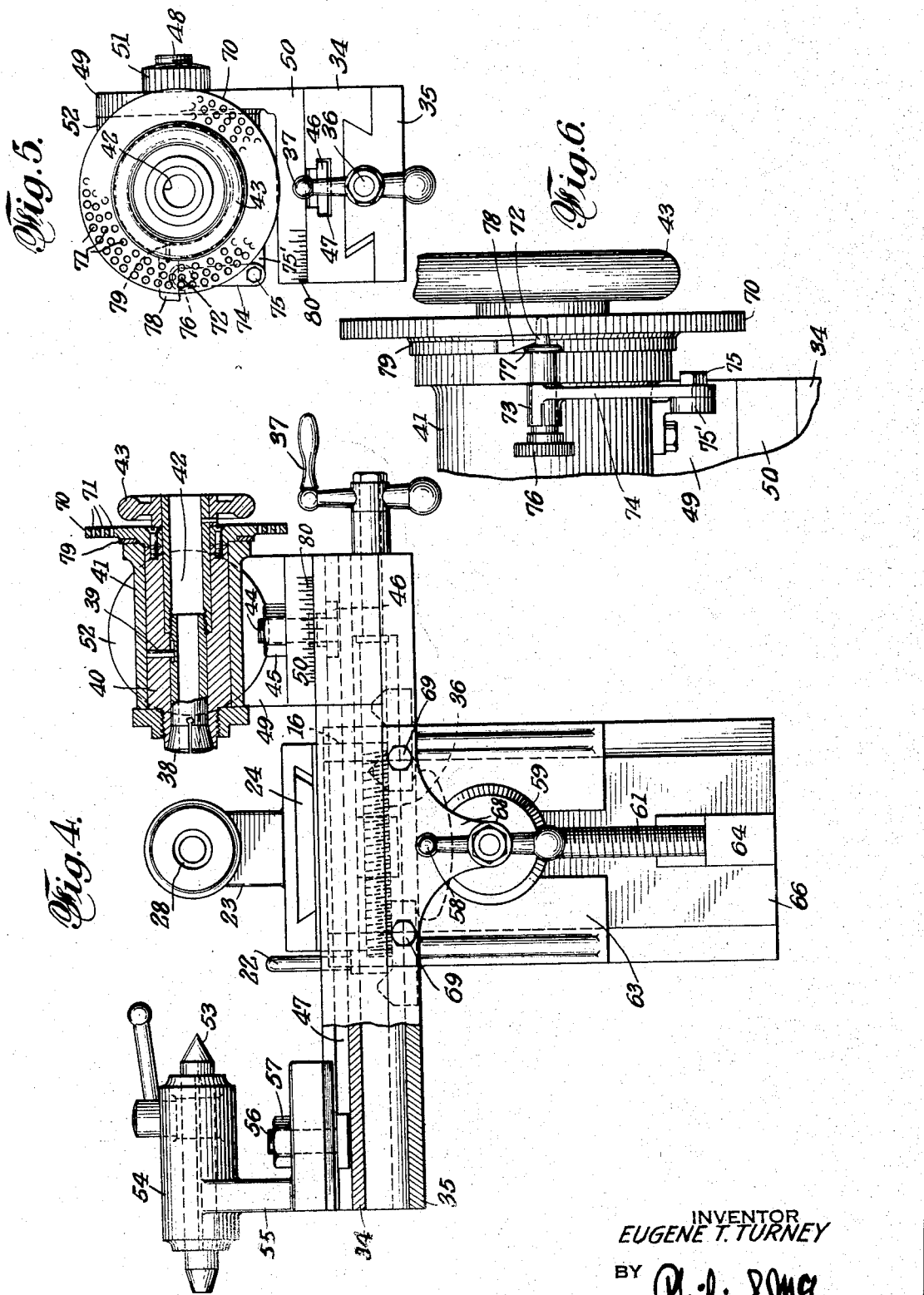

Patented Mar. 9, 1937

2,073,505

UNITED STATES PATENT OFFICE 2,073,505

MILLING MACHINE

Eugene T. Turney, Holmes, N. Y.

Application February 4, 1936, Serial No. 62,249

7 Claims. (Cl. 90—16)

This invention relates to milling machines.

A special object of the invention is to provide the parts of a milling machine in a unit form which may be mounted on the bed of a lathe and there be driven from the head stock of the lathe.

The invention comprises therefore a milling machine base adapted to be mounted on the tail stock end of a lathe bed and carrying relatively adjustable cutter spindle, work carriage and necessary related parts, together with drive connections from the head stock of the lathe to the cutter spindle of the milling machine unit. A special feature of this drive is that the chuck of the head stock is utilized as a driver for a shaft extending, after removal of the tail stock of the lathe, to the cutter spindle, located substantially on the lathe center.

Other objects and novel features of the invention are set forth or will appear in the course of the following specification.

The drawings accompanying and forming part of the specification illustrate a practical and at present preferred embodiment of the invention, but it is to be understood that changes and modifications in structure and operation are contemplated and covered within the broad spirit and true scope of the invention.

Fig. 3 is an enlarged, broken cross-sectional view on substantially the plane of line 3—3 of Fig. 1.

Fig. 4 is an end view of the milling machine unit with parts broken and appearing in section.

Fig. 5 is an end view of the work holding collet and indexing head.

Fig. 6 is a broken side elevation, on a larger scale, of the indexing head mechanism.

Fig. 7 is a broken part sectional detail of the index radius.

Figure 1:
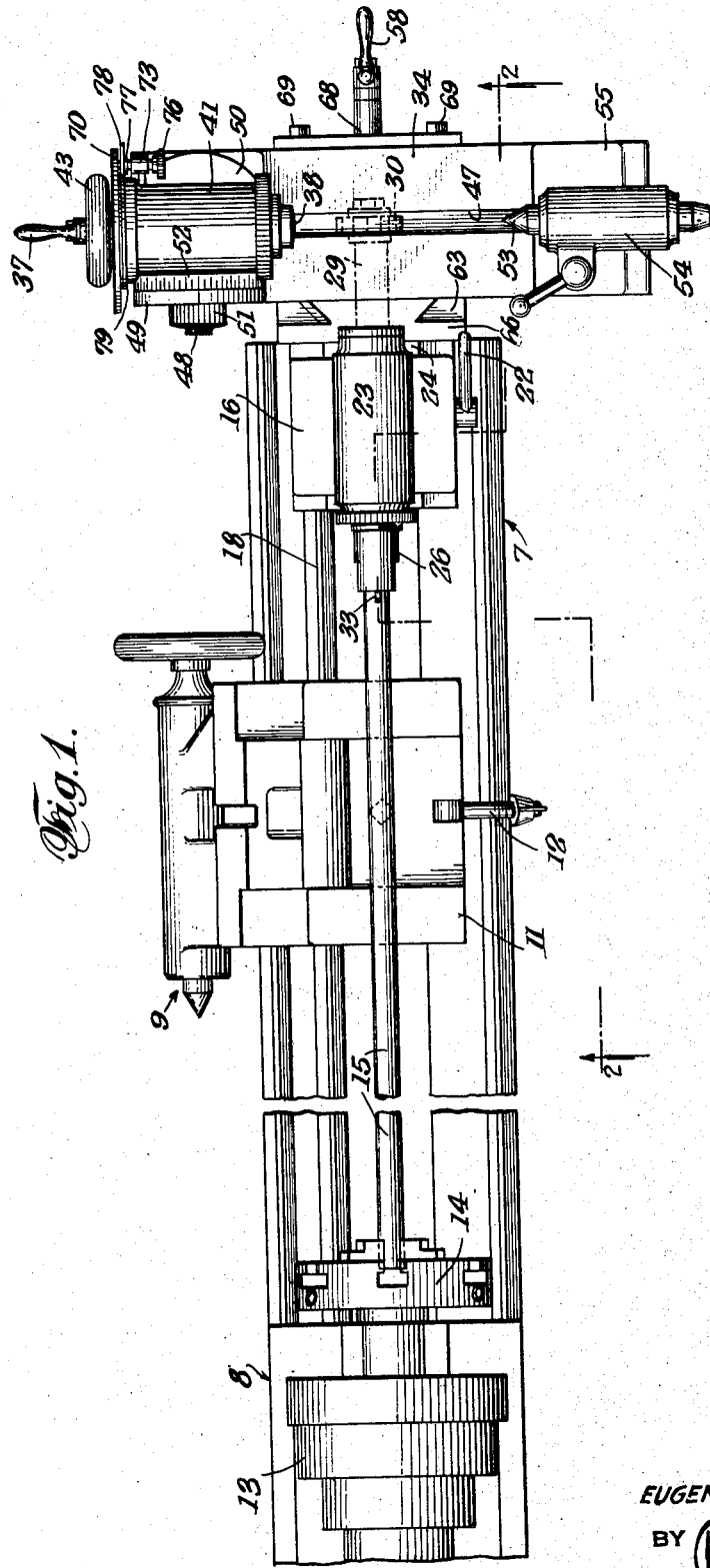
Fig. 1 is a broken plan view of one commercial form of the invention, parts of the lathe, such as the tool carriage, being omitted for simplicity.

Those parts of the lathe contributing to and in a way forming part of the invention, consist mainly of the lathe bed 7, forming the base and foundation of the miller and the head stock 8, constituting the driving agency for the miller. The lathe shown is of usual and more or less standard design except for the fact that the tail stock 9, instead of being merely removable from the bed, is illustrated as hinged at 10, to its base 11, so that it may be readily swung back out of the way, as in Figs. 1, 2, 3, to provide clearance for the inserted drive shaft from the head stock to the miller spindle. When in use for lathe purposes this tail stock is securely held down on its base by means such as the swing bolt 12.

Details of the head stock are not shown, but it will be appreciated that this may have all the usual change speed pulleys 13, chuck 14, gearing and other usual or special parts, it being a feature of the invention that this head stock mechanism need not be disturbed and that full use of the change speed and other facilities may be utilized for desired operation of the milling machine. Advantageously the chuck may be of the self-centering type for automatically centering the shaft section 15, which drives the miller.

Figure 2:
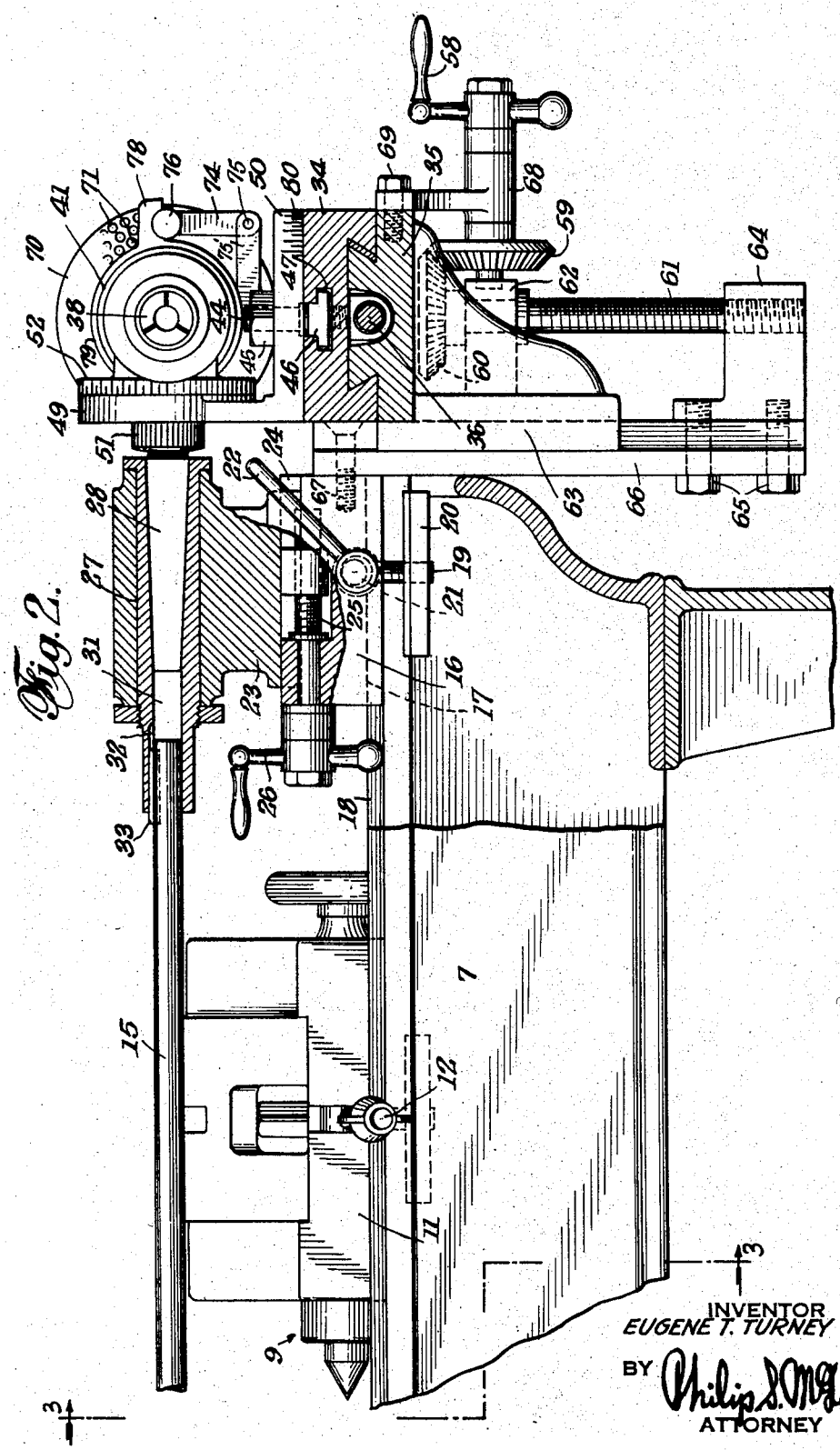
Fig. 2 is a broken and enlarged, partly sectional view, substantially as on the line 2—2 of Fig. 1.

The base 16 of the milling machine unit is designed to fit the lathe bed and particularly to be accurately and firmly centered thereon, as by being grooved at 17, to receive and engage one or more of the guide rails or ribs 18 of the bed, Figs. 1 and 2. This base is shown as held firmly seated on the bed by screw bolt 19, engaged with an under clamp 20, the head of this bolt being engaged by a pull down eccentric 21, which is quickly releasable by a hand lever 22.

Directly mounted on the base 16, is shown a slide 23, operating in guideway 24, longitudinally of the lathe and shiftable by screw shaft 25, journaled in the base and turned by handle 26. This slide forms the mounting for the cutter spindle, represented by the tubular shafting 27, journaled in the head of the slide, having a taper socket 28 in the outer end providing a chuck for the arbor 29, of the cutter 30, Figs. 1 and 2, and a socket 31, in the inner end, slidingly receiving the end of drive shaft 15 and provided with a keyway 32 for the key or feather 33 on the end of that shaft. If desired an outboard bearing for the cutter may be carried by the slide.

This construction provides both a readily connectible and disconnectible drive from the live head of the lathe and a feed of the cutter along its axis. The cutter spindle is aligned with the lathe center so that a shaft length 15, centered in the lathe chuck will accurately and smoothly drive the cutter. This shaft may have an easy floating fit in the key socket 31, to allow for possible misalignment, to facilitate slipping the coupling shaft into and out of place between the drive chuck 14 and the driven shaft 27 and to enable smooth, easy feeding action of the cutters.

The work carriage is represented in the present disclosure as a slide 34, Figs. 1, 2, 4, and 5, operating transversely of the lathe axis on a supporting guide 35 and shiftable by screw shaft 36, having handle 37.

The work holder is shown in Figs. 3, 4, as a collet chuck 38, slidingly keyed at 39, in the chuck sleeve 40, which is rotatably held in the chuck supporting head 41, mounted on the work carriage slide. A screw sleeve 42, provided with hand wheel 43 is shown engaged with the collet sleeve for effecting opening and closing of the latter.

The chuck head 41, is shown as angularly as well as bodily adjustable along the work carriage by being rotatably held on the shank of an upright bolt 44, by nut 45, which bolt has an angular head 46, Figs. 2, 4, 5, slidingly retained in the undercut channel 47 in the carriage.

In addition, the work chuck has angular adjustment about a horizontal axis, in the illustration, by reason of the head 41, being carried by stud 48, rotatable in the upright wall 49, Fig. 2, of the chuck base 50 and held by nut 51, on the outer screw threaded end of the stud. A concentric flange 52 on the head 41, cooperating with support 49 and suitably indexed as in Fig. 1, in degrees or the like, facilitates desired setting of the work chuck about the horizontal axis at 48 and an index radius 80, on the base 50, of the index head facilitates adjustments in respect to the vertical axis represented at 44.

The adjustments described enable the work to be placed at various angles to the cutter, about either or both a horizontal and a vertical axis.

For cooperation with the chuck in supporting the work, there is shown in the illustration, a center 53, adjustably held in the split clamp 54, on the post 55, secured on the carriage slide by clamp bolt 56 and nut 57.

Vertical adjustment of the work is effected in the illustration from a handle 58, operating a bevel gear 59, in mesh with a corresponding gear 60, on the upper end of a vertical screw shaft 61, having a shouldered bearing at 62, in a vertically traveling slide 63, Figs. 2, 4, carrying the carriage supporting guide 35, said screw shaft having threaded engagement at the lower end in a supporting nut block 64. The latter is shown bolted at 65, to the lower end of the vertical guide 66, over which the slide 63 operates and this guide is shown secured at 67, to the outer end of the base 16, in position to extend down over the end of the lathe bed. This dependent extension of the milling machine base may be utilized as a stop engaging the end of the lathe bed, as in Fig. 2, to definitely position the machine unit thereon and in that relation to be braced by the end of the lathe.

The bearing 68 for the work raising and lowering crank handle 58, is shown bolted to the transverse carriage supporting guide 35, Fig. 2, so as to raise and lower with the same.

The work holding collet may be secured and be turned as required by an indexing flange 70, at the outer end of the same, provided with appropriately spaced openings or depressions 71, engageable by a holding pin 72. In the illustration, there are three concentric rows of differently spaced indexing openings and the pin is mounted in a spring slip socket 73, on the upper end of a link 74, pivoted at 75, on a bracket 75' on the chuck head 41, Fig. 6. A knob or finger grip 76, on the outer end of the pin facilitates use of the same, and a stop flange 77, at the inner end prevents complete withdrawal from the slip socket.

With a sufficient number of rows of differently spaced holes any work may be quickly and easily indexed, the knob 76 serving as a handle both to swing the link 74, to register the pin with the proper row and to insert the pin in or withdraw it from the correct opening in that row. The hinged mounting of this pin enables it to be swung down clear to permit angular adjustments of the chuck.

Indexing is facilitated in the present disclosure by an index finger 78, positioned to engage the holding pin 72, as in Fig. 6 and frictionally carried by the chuck sleeve 40, as by having a split spring ring 79, encircling said sleeve, as in Figs. 4 and 5. After a cut is completed this index finger may be turned from its position against the holding pin 72, to the proper hole for the next indexing movement. Then, upon withdrawing the holding pin, the chuck may be turned by the indexing flange carrying with it the index fingers to bring the hole thus marked by the index finger into registry with the pin, which may then be projected to hold the work in this advanced position.

From the foregoing, it will be apparent that the milling machine unit may be quickly mounted on or be removed from a lathe. The cutter spindle is easily coupled to or uncoupled from the head stock and this is accomplished without disturbing the lathe parts, except for the displacing of the tail stock to provide clearance for the coupling shaft. As the shifting, or removal and replacement of the tail stock is a simple matter, the milling machine unit may be left practically as a permanent fixture on the lathe and the combined machine be alternately used for lathe and milling machine purposes. An example of such alternate use might be the case of a gear blank being spoiled on the miller. Then it becomes a very simple matter to remove the coupling shaft 15, replace the tail stock and quickly turn a new blank. If the full length of the lathe bed is required at any time, as for turning a long shaft, the milling machine unit may then be removed to permit use of the tail stock at the extreme end of the lathe bed. All and any special advantages of the lathe head stock, such as speed variations, etc., are available to operation of the miller. The displacement of the tail stock, either by complete removal, as in an ordinary lathe, or by the simple back swinging movement, as in the special lathe here illustrated, is a simple matter and the replacement for changing back to lathe use is just as simple and easy. The milling machine unit is of compact, sturdy design adapting it for use in limited spaces. It is completely universal in its operation, all adjustments are simple and the cross feeds of the tool and of the work are particularly direct and easily effected.

As the invention is basic in character the claims are to be construed accordingly, the terms employed being used in a descriptive rather than in a limiting sense. Many modifications may be made to adapt the machine to special requirements. A convenient method of constructing the index radius is as shown in Fig. 7, to provide a register plate 81, fixed on the bolt 44, or otherwise held against rotation, as by being slidingly keyed in the transverse way 47 at 82. This plate slides bodily with the indexing head but remains stationary when the indexing head is rotated angularly about the axis 44, and it may carry one or more register marks 83, for cooperation with the scale 80.

What is claimed is:

1. In a milling attachment for a lathe having a removable tail stock, a base for mounting on the lathe bed and provided with means for securing it in fixed relation on the lathe bed, a spindle housing adjustable on said base longitudinally of the lathe center, a cutter spindle journalled in said spindle housing on an axis substantially corresponding with the lathe center, a drive shaft for removable connection with the head stock of the lathe and having a telescopic connection with said cutter spindle for driving the milling attachment from the lathe and maintaining the lathe set up during operation of said milling attachment, indexible workholding means mounted on said base and means to move said workholding means relative to the cutter spindle.

2. In a milling attachment for a lathe having a tail stock removable from the lathe center, a base having a portion for seating on the lathe bed and an angular extension dependent down over the end of the lathe bed, means for securing said base in such relation on the bed of a lathe, a spindle housing on that portion of the base seating on the lathe bed, a cutter spindle journalled in said spindle housing on an axis substantially corresponding with the lathe center, a drive shaft for removable connection with the head stock of the lathe and having a driving connection with said cutter spindle for driving the latter from the lathe while maintaining the setup of the lathe during milling operations and a workholder on the dependent portion of the base and vertically, horizontally and angularly adjustable thereon in relation to the cutter spindle.

3. In a milling attachment for a lathe having a tail stock removable from the lathe center, a base having a portion for seating on the lathe bed and an angular extension dependent down over the end of the lathe bed, means for securing said base in such relation on the bed of a lathe, a spindle housing on that portion of the base seating on the lathe bed, a cutter spindle journalled in said spindle housing on an axis substantially corresponding with the lathe center, a drive shaft for removable connection with the head stock of the lathe and having a driving connection with said cutter spindle for driving the latter from the lathe while maintaining the setup of the lathe during milling operations, a workholder on the dependent portion of the base and vertically, horizontally and angularly adjustable thereon in relation to the cutter spindle, said spindle housing being mounted for adjustment longitudinally of the lathe center to effect feed of the cutter and the driving means described including a slide connection enabling such feed adjustments of the spindle housing.

4. In a milling attachment for a lathe having a head stock with a workholding chuck and a tail stock removable from the lathe center, a base for mounting on the bed of the lathe and provided with means for fixedly securing the same on the lathe bed, a spindle housing adjustable on said base longitudinally of the lathe center, a hollow open end cutter spindle journalled in said housing, a shaft removably engageable in the lathe chuck and having a telescopic driving engagement in the open end of the cutter spindle, indexible workholding means mounted on said base and means to move said workholding means relative to the cutter spindle.

5. In combination with a lathe having a head stock with a workholding chuck and a tail stock including a base member secured on the lathe bed and a tail stock structure mounted on said base member with a swing point enabling said tail stock structure to be displaced from the lathe center, a milling attachment base seated on the lathe bed and provided with means for fixedly securing the same in position on said lathe bed, a spindle housing adjustable on said base longitudinally of the lathe center, a spindle journalled in said housing substantially in line with the lathe center, a removable drive shaft connection between said lathe chuck and cutter spindle and including a slide joint enabling cutter feeding adjustments of the spindle housing, indexible workholding means mounted on said base and means to move said workholding means relative to the cutter spindle.

6. In a milling attachment for a lathe having a fixed head stock at one end of the lathe bed, a base having a portion for seating directly on the opposite, tail stock end of the lathe bed and an angular extension dependent therefrom down over the end of the lathe bed, means for firmly securing said base in such position on the lathe bed opposed to the head stock at the opposite end of the lathe bed, a spindle housing on that portion of the base seating on the lathe bed, a cutter spindle journalled in said spindle housing, a removable shaft drive connection from the head stock of the lathe to said cutter spindle for driving the latter from the lathe while maintaining the set-up of the lathe during milling operations, a work holder on the dependent portion of the base at the tail stock end of the bed, means for effecting various adjustments of said work holder with respect to the cutter spindle, and means for effecting relative cutter feeding movements of said cutter spindle and work-holding means longitudinally of the lathe center.

7. In a milling attachment for a lathe having a head stock with a work-holding chuck and a tail stock removable from the lathe center, a base having a portion for seating directly on the tail stock end of the bed of the lathe directly opposite the head stock, means for firmly securing said base on the bed in such position opposed to the head stock, a spindle housing on said base, a cutter spindle journalled in said housing substantially on the lathe center directly opposite the chuck of the head stock, work holding means variously adjustable on said lathe bed supported base in relation to said cutter spindle, means for effecting relative movements of said cutter spindle and work-holding means longitudinally of the lathe axis for cutter feeding purposes and removable drive shaft connections from the lathe chuck to said cutter spindle operative irrespective of said relative feed movements of the cutter spindle and work-holding means.

EUGENE T. TURNEY.